United States Patent [19]

Parsons

[11] Patent Number: 4,730,382

[45] Date of Patent: Mar. 15, 1988

[54] MELTABLE MATRIX CHUCKING AND MACHINING

[76] Inventor: John T. Parsons, 205 Wellington, Traverse City, Mich. 49684

[21] Appl. No.: 930,906

[22] Filed: Nov. 17, 1986

Related U.S. Application Data

[62] Division of Ser. No. 644,611, Aug. 27, 1984, Pat. No. 4,629,378.

[51] Int. Cl.$^4$ ............................................. B23Q 3/00
[52] U.S. Cl. .......................................... 29/563; 269/7; 409/221
[58] Field of Search .................. 29/563, 564, 33 R; 409/162, 164, 168, 172, 174, 221, 224; 269/7, 56, 57; 248/664, 666, 667

[56] References Cited

U.S. PATENT DOCUMENTS

| | | | |
|---|---|---|---|
| 3,083,002 | 3/1963 | Lacey, Jr. | 269/7 |
| 3,596,317 | 8/1971 | Nicholson | 269/7 |
| 3,700,228 | 10/1972 | Peale | 269/57 |
| 3,790,152 | 2/1974 | Parsons | 269/7 |

FOREIGN PATENT DOCUMENTS

| | | | |
|---|---|---|---|
| 129647 | 10/1979 | Japan | 414/222 |
| 165942 | 10/1983 | Japan | 269/7 |
| 770732 | 10/1980 | U.S.S.R. | 269/7 |
| 814591 | 3/1981 | U.S.S.R. | 408/241 R |
| 1126405 | 11/1984 | U.S.S.R. | 269/7 |

*Primary Examiner*—Gil Weidenfeld
*Assistant Examiner*—Daniel W. Howell
*Attorney, Agent, or Firm*—Jerome A. Gross

[57] ABSTRACT

An integrated factory system affords precision machining and inspection of aircraft turbine blades, as well as other metal parts having two generally opposite principal surfaces. It uses only two stages of chucking by the meltable matrix method. After embedding one of the surfaces in the first chuck, which positions the blank relative to a plane of reference, the other surface is machined and inspected according to programs relative to that plane. Without release from the first chuck, the part is transferred to a second chuck for embedding the machined principal surface relative to a second parallel plane of reference a precise distance from that of the first chuck. Machining and inspection is now completed relative to this second plane of reference.

Improved matrix chucks are provided, as well as new chucking apparatus which establishes the planes of reference. A milling machine is provided whose machine table may tilt about a longitudinal axis, alternately raising the long edges of the chuck so that the leading and trailing edges of a blade blank may be completely machined without re-chucking. The machine table is mounted for swinging in reversing arcs about a vertical axis, from which the chucked blade blanks are positioned radially to coincide with their positions about the rotary axis of the engine. The tilt and swing movements of the machine table are programmed as part of the two-stage machining and inspection program.

4 Claims, 7 Drawing Figures

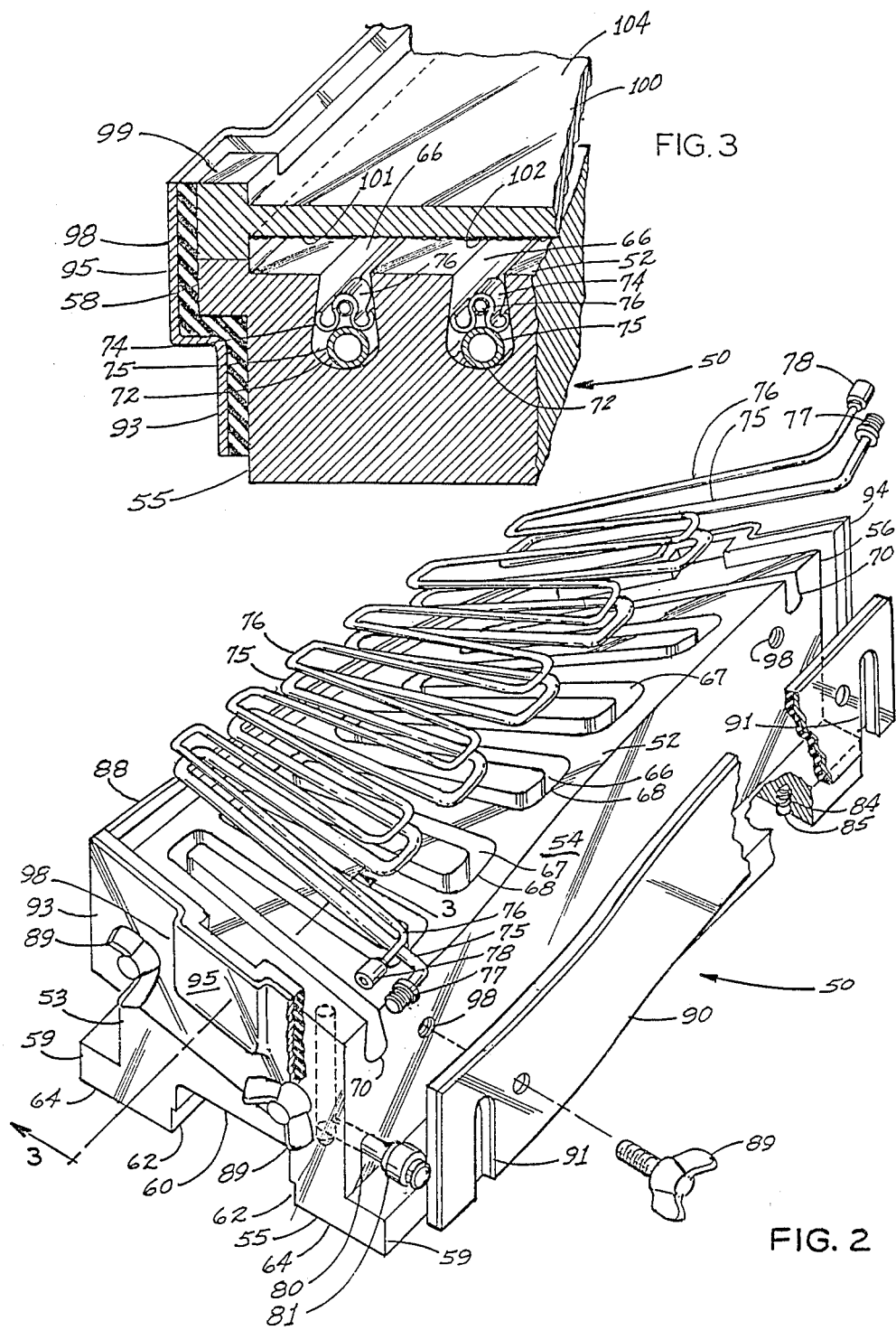

MELTABLE MATRIX CHUCKING AND MACHINING

This is a division of application Ser. No. 644,611, filed Aug. 27, 1984, now U.S. Pat. No. 4,629,378.

TECHNICAL FIELD

This invention relates to the machining of metal parts of meltable matrix chucking of two generally opposite principal surfaces. The invention has special applicability to making the blades for turbine engines and other thin workpieces; and embraces a factory system wherein forged or cast blanks may be chucked, processed as by machining to finished dimensions, and inspected in only two stages of operations.

BACKGROUND ART

Turbine engine blades, and particularly those used for aircraft, must be machined to precise airfoil contour, with perfect control of thickness. Chucking to machine to the necessary thinness is difficult, the blade blanks being likely to deflect severely under forces of machining. The present general practice appears to be to machine the blades oversize, and then hand file them to fit the contour of templates.

Meltable matrix chucking in which an entire blade surface may be held embedded in a low melting point metal matrix, is known from my U.S. Pat. No. 3,790,152. This chucking method avoids deflection under machining forces. The fixture there shown proved to be satisfactory for relatively small blades. However, in order to handle larger blade blanks, and transfer them from one chuck to another in mass production, the folding fixture there shown was not adequate.

Further, chuck improvements were necessary to speed the meltable matrix process and adapt it to blades which were more highly twisted. Finally, to achieve faster production, entirely new machining and inspection equipment was necessary to finish the blades in essentially a two-stage operation described hereafter.

DISCLOSURE OF THE INVENTION

The purposes of the present invention include providing an entire factory system, including chucking, machining and inspection apparatus whereby metal parts having two generally opposite principal surfaces, and particularly turbine blades, may be chucked and machined to precise final contour, and even inspected, in only two stages of operations.

A further purpose is to provide improved chucks for supporting such parts by one of their principal surfaces, to provide better heat-transfer and convenience characteristics. An additional purpose is to provide an improved fixture, hereinafter referred to as a chucking barrel, for precisely aligning, superimposing, and reversing the positions of two meltable matrix chucks as the melted matrix material, heating and chilling are supplied.

A still further purpose is to provide a machine tool with capability for programmed milling according to two new procedures, namely: (1) around the leading and trailing edges of a blade, one of whose principal surfaces is supported in a meltable matrix chuck, and (2) in cuts not taken chord-wise but arcuately about an axis of rotation spaced from the root end of the blade blank.

An added purpose is to provide for a programmed series of inspection readings of each of the principal surfaces after it is machined before the part is released from the meltable matrix chuck.

Considered as method, the present invention provides for complete machining according to a unitary program, in a two-stage procedure in which the first chuck establishes a first plane of reference, for machining one principal surface in the first stage of the program; followed by spacing a second chuck away from the machined surface with the plane of reference of the second chuck parallel to and at a precisely fixed distance from that of the first chuck. Then in milling the previously un-machined surface, its program may be in effect a mere continuation of the program for milling the first surface.

Considered as apparatus, the present invention includes a chucking center which provides a barrel frame and means to mount it along a horizontal pivot axis, a first track portion on the frame, which supports a meltable matrix chuck and establishes a first horizontal plane of reference, relative to which the blank is to be machined; and an alternate track portion, supported on a frame 180° removed from the first track portion, the alternate track portion having means to set it at a second plane of reference a design distance from the first plane. Means are provided to rotate the frame precisely 180° about the horizontal pivot axis. The chucking center further has means to supply electricity for heating the chucks, refrigerant for cooling them, and melted matrix material to be introduced to them in molten condition.

A pair of meltable matrix chucks are required, each of the type having a normally upward surface fillable with melted matrix material, up to the lower principal surface of a correspondingly shaped blank to be machined, dams being secured agains the edges of the blank, much as shown in my prior patent. Each chuck has means for clamping, to locate it relative to its own plane of reference. The chucks accommodate electric heater and refrigerant conducting means within a serpentine pattern of large, open grooves in their normally upward surfaces; when melted matrix material is introduced, it is not necessary to heat or chill the chucks themselves to any substantial extent; rather the heating and chilling is transferred directly to the matrix material.

When a chuck, on either the said first track portion or the alternate track portion, is at the lower side of the chucking barrel, it may be removed and conveyed from the barrel along track means to a machining center, part of the present invention, including a unique milling machine providing two movements which are believed to be entirely novel;

(1) The machine table, bearing a track segment onto which the chuck is secured, tilts about horizontal longitudinal pivot axis, to elevate the leading or trailing edge of the blade blank alternately, thereby permitting access for the cutting tool.

(2) One end of this machining table swings about a vertical axis spaced from the root end of the chucked blade blank. The opposite end of the table is driven reversingly in an arc. Accordingly the path of a transverse cut will be along an arc about the swing axis rather than in chordwise cuts.

Inspection apparatus having similar movements permits a programmed series of readings relative to the same plane of reference, on each of the principal surfaces, when newly machined and before removing the blank from its chuck. Such inspection apparatus preferably includes a similar table, capable not only of movements corresponding to those required along the lead screw of the milling machine, but also of tilting movements about a longitudinal pivot axis spaced the same distance below the chuck as the spacing in the milling machine described, and with a similar vertical swing axis and capability of reversing arcuate movements thereabout. A mechanical measuring probe or optical measuring device, as one of the laser type, is positioned at a series of settings, at inspection points, at which the programmed readings are to be taken, the settings being achieved by combined movements along and transverse to the lead screw with the tilt and swing movements of the table. For simplifying the illustrations herein, such a measuring device is shown mounted on the milling machine itself, on the same carriage as the cutting tool, and positioned 180° therefrom when not in use. However, in production one would provide a separate inspection tool, to which the chuck would be conveyed after completing milling of a surface.

THE DRAWINGS

FIG. 2 is a perspective view of a typical meltable matrix chuck, part of the present invention, with a serpentine electric heating element and refrigerant coil shown in exploded position above a pattern of serpentine grooves in the chuck upper face. Dams, to be fitted about the sides of the chuck, are shown fragmentarily and exploded.

FIG. 3 is an enlarged cross-section taken along lines 3—3 of FIG. 2 of an end portion of the chuck, with the heating and refrigerant lines shown positioned in the grooves in the chuck.

BEST MODE FOR CARRYING OUT THE INVENTION

Figure 1:
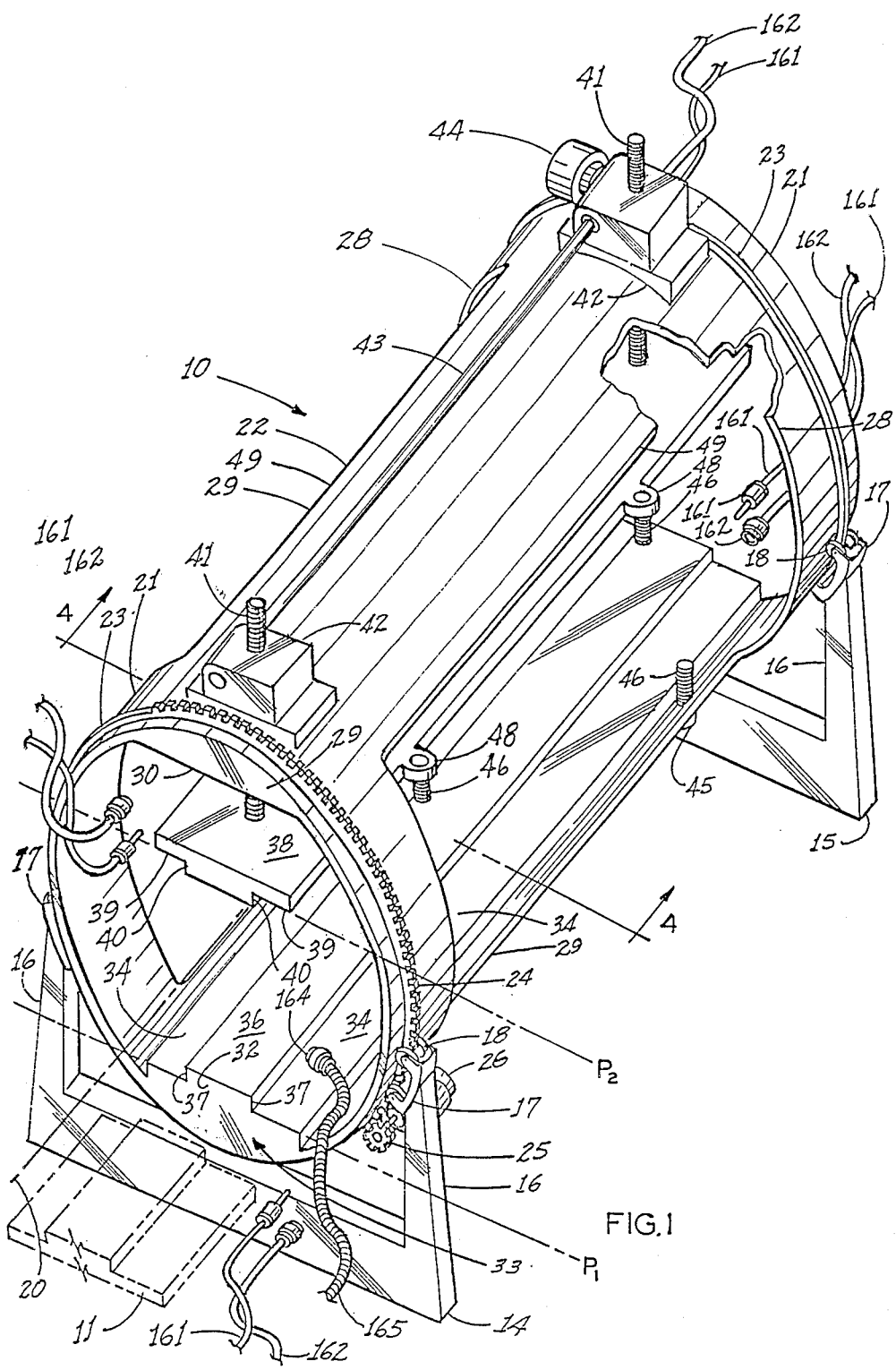
FIG. 1 is a perspective view of a chucking barrel, being one of the components of the present invention. Refrigerant lines, connections for electric heating and heat line for supplying matrix material are shown fragmentary.

A chucking center, part of the present invention, includes known means to supply, to chucks of the meltable matrix type, a molten matrix material, preferably which freezes at a low temperature, say approximately 160° F. Also included in the chucking center are known means to supply refrigerated liquid and electric energy and heating. The principal novel apparatus at the chucking center is a chucking barrel frame generally designated 10, best seen in FIG. 1 and means to support it along a horizontal pivot axis. The support means are as follows: Situated beyond the end of a conveyor track generally designated 11 are aligned yoke-like forward and rear vertical stands 14, 15 having upright support arms 16 terminating in inward-facing roller supports 17 providing spaced-apart inward-facing pairs of support rolls 18. These support rolls 18 are positioned on opposite sides of and somewhat below a horizontal pivot axis 20, to permit rotation thereabout of a supported rotatable barrel frame generally designated 22, seen in perspective in FIG. 1.

The barrel frame 22, which at first glance presents the appearance of a windowed, thin-walled hollow cylinder, is supported on the support rolls 18, which bear against cylindrical wall portions 21 adjacent to its forward and rear ends. On these are mounted outer guide rings 23, which the pairs of support rolls 18 span. On the outer side of these guide rings 23 shown near the lower portion of FIG. 1, is mounted a 180° gear sector 24, driven reversibly by a spur gear 25, mounted on the power shaft of a reversing motor 26 supported on the right arm 16 of the forward vertical yoke stand 14, as seen in FIG. 1.

For access within the barrel frame 22, large cut-out window openings 28 are provided in both its sides. Strength and bending rigidity are afforded, however, by an upper longitudinal reinforcement 29 whose undersurface 30 is planar, and an even heavier reinforcing section 32 diametrically opposite it, whose cross-section may be essentially a combination of the longitudinal reinforcement 29 and a track portion which mates with the conveyor track 11, together referred to as the barrel lower track portion generally designated 33.

This barrel lower track portion 33 is precisely machined; it includes outer horizontal planar upper surface portions 34 which provide a first plane of reference $P_1$ at a fixed radial distance from the horizontal pivot axis 20. These outer portions 34 are separated by an elevated central somewhat rectangular portion 36 having precisely machined vertical guide margins 37, which establish the transverse location of a chuck on the plane of reference.

An alternate track portion 38, shown inverted in FIG. 1 and whose upper portions are configured similarly to the lower track portion 33 has planar outer portions 39 which establish a second plane of reference $P_2$ and vertical guide margins 40. The alternate track portion 38 is positioned within the chucking barrel frame 22 by the screw rods 41 of forward and rear ball screw drives 42 mounted on the outer surface of the chucking barrel 22 inwardly of the guide rings 23. The extension of the two ball screw rods 41 is precisely coordinated and controlled through a common drive shaft 43, controlled by a reversible motor 44. Thus, the alternate track portion 38 has its plane of reference $P_2$ maintained parallel to the first plane of reference $P_1$ at all times. Through the drive motor 44 these planes of reference are set at the precise spacing required to correlate the two planes of reference when transferring a partly machined blank from one meltable matrix chuck to the other, as hereinafter described.

When not in use for transfer, the alternate track portion 38 is retracted to the upper longitudinal reinforcement 29, at which it is as far from the pivot axis 20 as is the first-mentioned barrel track portion 33. Thus, when the chucking barrel 22 is rotated from the position shown in FIG. 1 to a position 180° removed therefrom, shown in FIG. 4, the alternate track portion 38 will be at the level of and aligned with the conveyor track 11.

Figure 4:
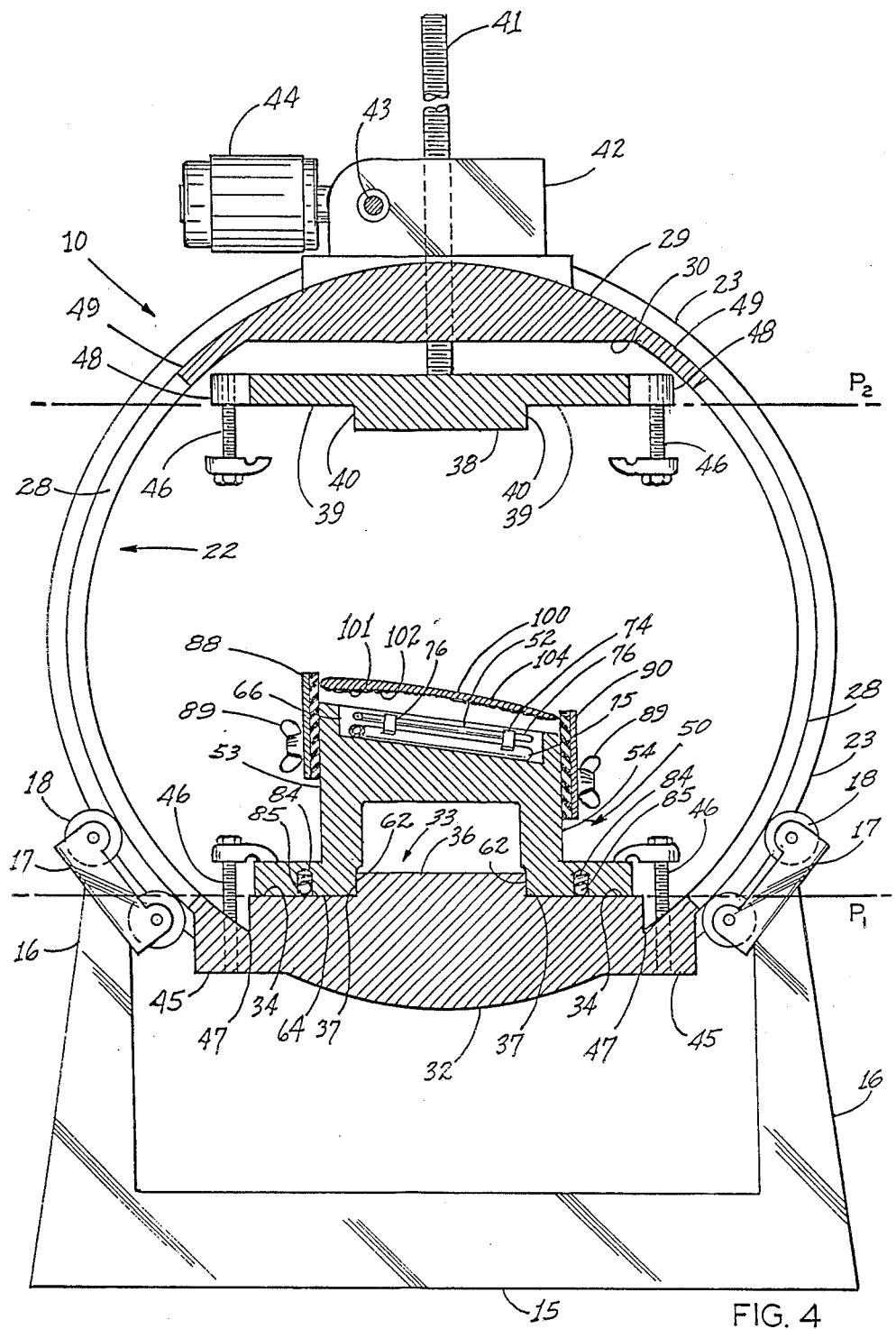
FIG. 4 is a typical cross-sectional view taken along lines 4—4 of FIG. 1 showing a chuck, loaded with a blade blank to be machined, in position on the chucking barrel first track portion.

At either side of the barrel track portion 33, and forming the lower edge of the side windows 28, are relatively heavy edge flanges 45, best seen in FIG. 4, which receive clamping screws 46 by which the chuck edge flanges 59 are secured to the barrel track portion. When in position shown in FIG. 4, these edge flanges 45 also serve as longitudinal drain grooves 47 to carry away melted matrix material which may overflow. Similar clamp screws 46 are secured to side lugs 48 projecting at intervals from the alternate track portion 38; upper window edge portions 49 are utilized to catch such overflow from a chuck mounted to the alternate track portion 38.

Figure 6:
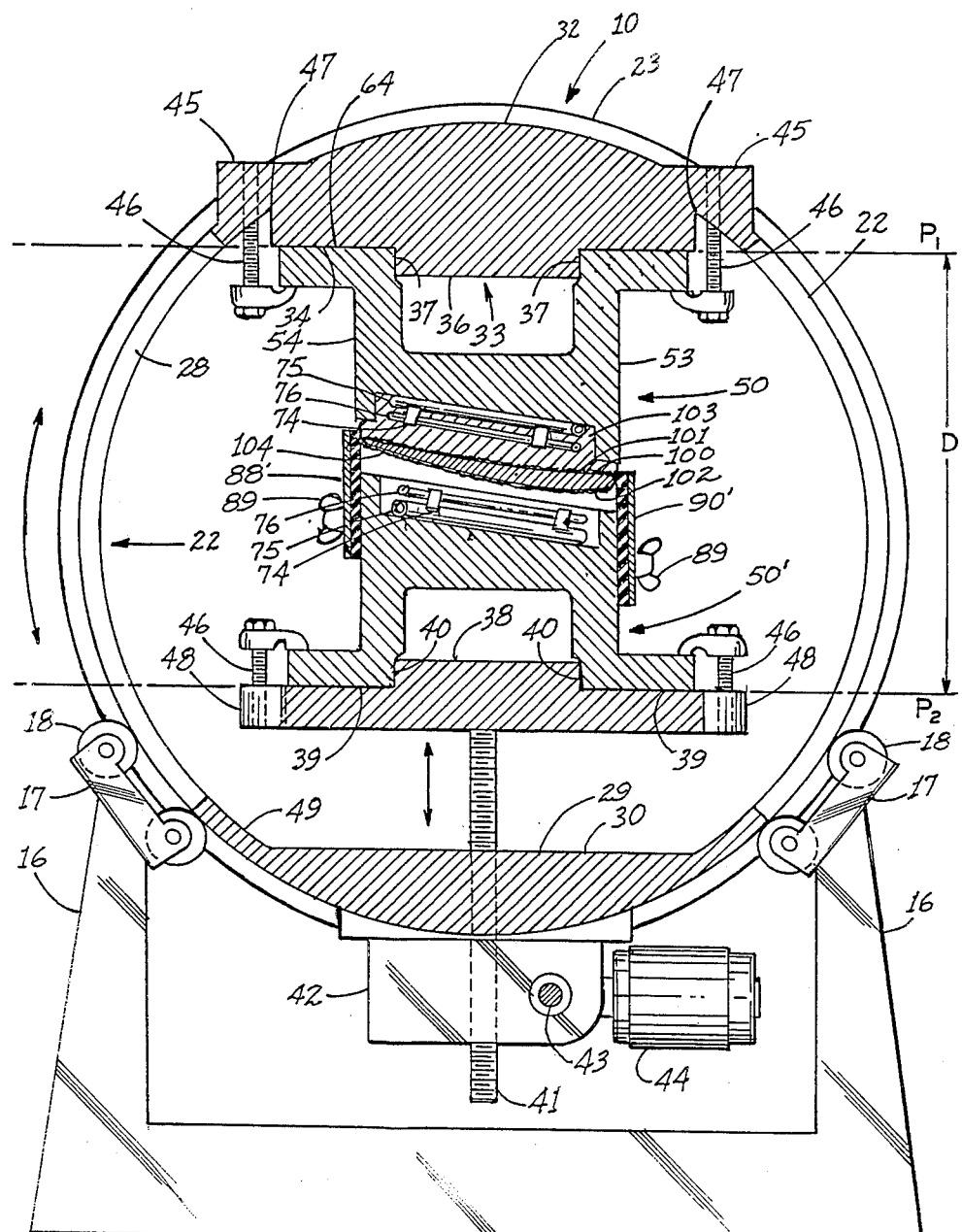
FIG. 6 is a cross-sectional view of the chucking barrel of FIG. 1 in position 180° reversed from that of FIG. 4, showing the transfer of the partly-machined first blade blank from the chuck shown in FIG. 4 (now inverted) to a second chuck on the alternate track portion.

A meltable matrix chuck generally designated 50, preferably made of cast metal, is seen in perspective in FIG. 2, in fragmentary cross-section in FIG. 3, and in cross-section in FIG. 4 and also inverted in the upper portion of FIG. 6. Inasmuch as the part to be chucked, in the present illustrative embodiment, is an elongated twisted turbine blade of nearly rectangular plan form, the chuck 50 has a plan form generally coincident with that of the blank. Inasmuch as the blank is twisted, like the turbine blade to be milled from it, the normally upward chuck surface 52 is correspondingly twisted or progressively canted, as seen in FIG. 2. The chuck 50 has vertical leading and trailing side surfaces 53, 54 and root end and tip end vertical surfaces 55, 56. As seen in FIG. 3, the root end surface 55 may have a central projection 58 endwise and upward for accommodating a root end lug 99 of a blade blank 100; and assuming the blade blank 100 has a tip end projection similar to the root end lug 99, the tip end surface 56 may have a projection similar to the central projection 58 on the root end surface 55.

Projecting sideward from the chuck side surfaces 53, 54 are clamping flanges 59. Midway between them, the chuck 50 is cast with a deep longitudinal recess 60 whose lower margins 62 are machined to provide a precise sliding fit along the vertical guide margins 37, 40 of the track portions 33, 38 of the barrel frame 22.

The entire undersurface 64 of the chuck 50, on both sides of its recess 60 and extending outward from the machined margin 62 to the outer edges of the clamping flanges 59, is machined for fitting onto the planar surface portions 34, 39 of said track portions 33, 38. Thus, both the transverse location of the chuck 50 on those track portions and the distance from the plane of reference $P_1$ or $P_2$ to a point of machining, established relative to such plane of reference and transverse location, is always precisely known.

Molded in the upper surface 52 of the chuck 50 is a pattern of continuous grooves 66 which is preferably serpentine with substantially parallel groove portions 67 extending chordwise and short groove connecting portions 68 extending endwise within the twisted upper surface 52. At the chuck side surface 54, as seen in FIG. 2, the grooves 66 have outlets 70. As seen from FIG. 3, the grooves 66 are narrower where they meet the chuck upper surface 52 than at their rounded bottoms 72, for the purpose hereafter described.

Laid within the grooves 66 adjacent to the groove bottoms 72 and secured therein by spring clips 74, is a serpentine refrigerant coil 75. Positioned thereover is a similarly shaped electric resistance heating element 76. The end portions of these extend outward through the groove outlets 70 in the side surface 54 of the chuck 50. At some convenient distance outward therefrom, the refrigerant coil 75 is equipped with quick release fittings 77 and the electric heater 76 with terminal ends 78 of any convenient type. Because the chuck upper surface 52 is twisted, the refrigerant coil 75 and heater element 76 are correspondingly twisted; the fact that the parallel groove portions 67 are arranged chordwise makes it relatively easy to bend the refrigerant coil and heater element 75, 76 to achieve corresponding twist.

Extending inward and upward from the chuck surface 52 immediately below the groove outlets 70 (shown lowermost in FIG. 2) and connecting upward to the groove bottom 72 there-adjacent is a matrix metal supply and drain channel 80, having an outward projecting end equipped with a quick disconnect fitting 81. When the refrigerant coil 75 and heater element 76 are in position in the grooves 66, they will be accommodated as shown in FIGS. 3 and 4. It is seen that the grooves 66 are of substantially greater cross-section than the cross-section occupied by the refrigerant and heater elements 75, 76, so that the matrix material, when molten, may readily flow alongside them within the grooves, for best conductivity. This permits the chucks to be ferrous castings which have relatively poor thermal conductivity for a metal, and whose hardness provides resistance to deflection, which is of great importance in the present invention.

Accommodated within vertical recesses 84 extending from the machined undersurface 64 upward into the clamping flanges 59 are spring-loaded balls 85 of conventional design, the springs being of sufficient strength to overcome the weight of the chuck assembly as later described. When the clamping flanges 59 are clamped downward against the machined planar surfaces 34, 39 of the track portion or alternate track portion 33, 38, the spring balls 85 retract in their recesses 84 so that machining of a blank held by the chuck may proceed at a precise distance from the plane of reference established by the surface machined portions 34, 39.

In order to provide a fill of melted matrix material between the chuck upper surface 52 and a blade blank 100 thereon, as best seen in FIG. 4, metal dams, lined with heavy soft rubber are utilized. Utilizing such dams is taught in my prior patent. Thus, a leading edge dam 88, applied by wing screws 89 to the leading side surface 53, rises vertically from the chuck 50 to a level slightly above that of the leading edge of the blade blank 100; the soft thick rubber liner is indented by the blade blank 100 to provide a secure seal. Likewise, a trailing edge dam 90 is fitted against the trailing side surface 54; the dam 90 is best seen in FIG. 2, which shows vertical slots 91 near both its ends, in longitudinal registration with the outlets 70. The vertical slot 91 at the nearer end of the chuck, shown in FIG. 2, accommodates the outward projecting ends of the electric heater element 76 and refrigerant coil 75, as well as the matrix disconnect fitting 81 below them; while the slot 91 near the opposite end of the trailing edge dam 90 accommodates the ends of the refrigerant coil 75 and heater element 76 there projecting.

Along the root and tip end surfaces 55, 56 of the chuck 50, dams 93, 94 are provided. As seen in FIGS. 2 and 3, each of these has a box-like endwise projecting portion 95 outward of the central projections 58 which receives the lugs 99 at the root and tip ends of the blade blank 100. Wing screws 89 are utilized to secure these dams through appropriately positioned threaded bores 98 in the body of the chuck 50.

Before positioning the blank 100 in the first chuck 50 and mounting the dams 88, 90, 93, 94, that principal surface of the blank 100 first to be chucked (referred to herein as the first principal surface 101) is coated with an adhesive 102, preferably an epoxy-type which cures at about 150° F. in approximately fifteen minutes. Melted matrix material 103, preferably a tin, lead and bismuth alloy which melts at approximately 158° F., to which the adhesive coating 102 will bond, is not shown in FIG. 4; for it see FIG. 6, hereafter described.

As seen in FIG. 4, upon chucking by adherence of the matrix material to the adhesive-coated first principal surface 101, a second principal surface 104 of the blank 100 will be presented upward for machining. After it has been machined to contour and coated with the adhesive material 103, and the chuck 50 returned to the chucking barrel and inverted as hereinafter described, this second principal surface 104 is presented downward as shown in FIG. 6, in position for transferring the blank 100 to a second chuck generally designated 50' to which dams 88', 90' are then secured. When the chucks 50, 50' are properly spaced from each other, as hereinafter described, a second set of dams 88', 90', 93', 94' (of which the first two only are shown in FIG. 6), corresponding substantially to the previously described dams 88, 90, 93, 94 for chuck 50, is secured in place as shown in FIG. 6. Inasmuch as the second principal surface 104 of the blank 100, including portions of its leading and trailing edges, has already been milled, reducing its chordwise extent somewhat, chuck 50' may be correspondingly narrower than chuck 50.

Figure 5:
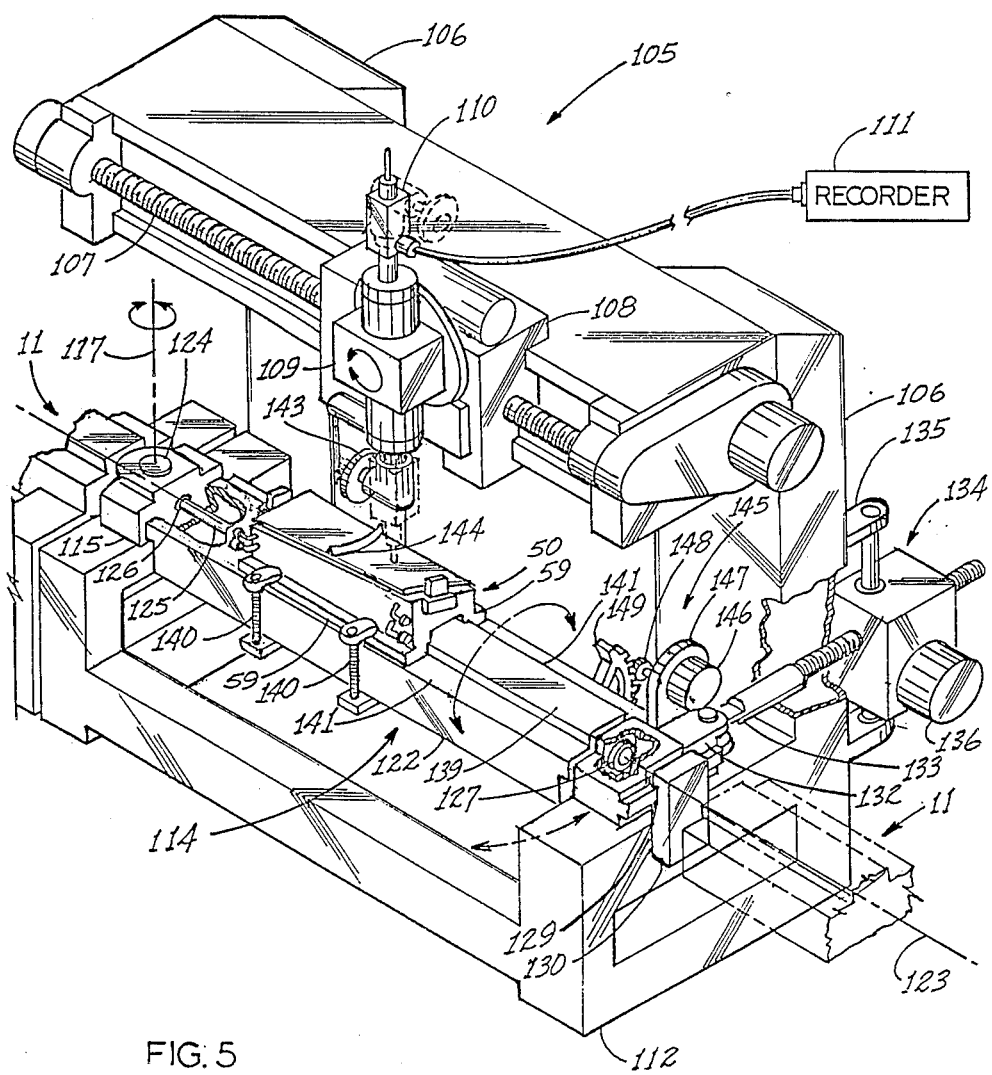
FIG. 5 is a perspective view of a milling machine, part of the present invention, with a chucked blade blank in position for machining. An electric inspection probe is shown in phantom lines.

A machining center, shown in FIG. 5 and generally designated 105, is adapted in its construction from a conventional tape-controlled milling machine. It has an open back flanked by pillars 106 and supporting conventional mechanism including a lead screw 107, a cutter carriage 108, and mechanism to afford the carriage a variety of movements, including vertical longitudinal (that is, along the lead screw), transverse to the lead screw, etc. The cutter carriage 108 here shown mounts a cutter mechanism 109 which may be moved arcuately in a vertical plane parallel to the lead screw 107. While such arcuate movement may not be required by the machining program, providing it with at least a 180° range permits mounting opposite it, by turning through such 180° angle, an electronic inspection probe 110, down per phantom lines and leading to an electronic recorder 111 for recording its successive readings. Such inspection probes, whether mechanical or optical (as with a laser) and recorders, are conventional and familiar. While this inspection provision will suffice for individual blade production, a physically separate inspection center, much less in cost than the machining center, is preferred for mass production, to free the machining center from inspection functions.

In the machine of FIG. 5, pillars 106 rise from a conventional base frame 112. Track conveyor connections 11 (leading to and from the chucking barrel 10 and other separate installations such as an inspection center) are positioned closely adjacent to and from both left and right outer sides of the machine base frame 112.

Unique to the present machining center is the construction of its machine table, generally designated 114. This consists of three parts: a left end part 115, which is movable through a small angle about a vertical or yaw axis; a right end part 120, which slides in reversing arcs about that axis, and a middle or tilt table part 122, mounted on bearings in the end parts 115 and 120, which provide a longitudinal tilt axis 123 below and parallel to the effective plane of the upper surface of the tilt table part 122.

In greater detail, the left end part 115 is provided with an embedded vertical bearing 124 supported in the left side of the base frame 112. Freedom of angular movement is provided by mounting the left end part 115, supported by the base frame 112, on a conventional horizontal bushing plate or other friction-minimizing means, not shown. Upper portions of the left end part 115 have the contour of the conveyor track 11.

At the inner side of the left end part 115 is a bearing 126 concentric with the axis 123, which mounts a shaft 125 concentric with the tilt axis 123 and extends to a corresponding bearing 127 mounted in the table right end part 120.

A horizontal bushing plate, not shown, lies between the upper surface of the base frame 112 and the lower surface of the table right end part 120, permitting this part to slide. A horizontal tongue-like projection on the outer side of the table right end part 120 slides in a groove 129 in a hold-down bar 130 bolted to the outer side of the base frame 112. The upper end of the hold-down bar 130 has the same track-like configuration as the remainder of the table 114; it serves in effect as an outward continuation of the right end part 102.

At the aft side of the right end part 120 is a clevis fitting 132 having a vertical axis. Mounted to this clevis fitting 132 is the horizontal driving rod 133 of a ball screw mechanism generally designated 134, which mechanism is pivot mounted by upper and lower rearward-extending lugs 135 on a vertical axis onto the right end pillar 106. The pillar 106 may be slotted as shown to provide for passage of the driving rod 135. The ball screw mechanism 134 is directed by a servo reversing motor 136 so as to provide table swinging movement around the axis 117.

The tilt table part 122 is mounted, as by conventional brackets, not shown, on the shaft 125. It is a rigid, heavy steel member, which may be hollow, whose upper portion is configured, in cross-sectional shape and dimensions, like the upper parts of the lower track portion 33 and alternate track portion 38 of the chucking center heretofore described. In particular, it has outer surface portions 141 which lie in a single plane, to which the tilt axis 123 is parallel.

FIG. 5 shows the chuck of FIG. 4, conveyed from the chucking center and in position for milling in the machining center, with its base flanges 59 clamped by clamping screws 140 to the table co-planar outer portions 141, which thus duplicate the plane of reference $P_1$ or $P_2$ for purpose of machining. With the chuck 50 so clamped in place (without the dams shown in FIG. 4), a blade blank is presented in position for milling by a milling cutter 143 mounted in the cutter mechanism 109. Assuming the blank principal surface to be milled includes a blade air-flow control fence 144 (as seen in FIG. 5) to be milled arcuately about the vertical axis 117, the importance of the swing movement about this axis will be abundantly clear.

Figure 7:
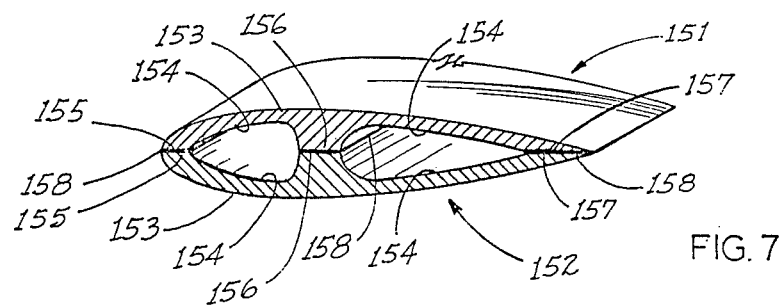
FIG. 7 is a fragmentary cross-section of a two-piece blade.

To permit the milling cutter 143 to complete machining the leading and trailing edge portions of a principal blank surface 101, 104, tilting of the table 122 about the axis 123 is directed by a tilting drive assembly generally designated 145. It consists of a tilting motor 146 mounted on a bracket 147 affixed to the right end table part 120 or its clevis fitting 132. On the shaft of the motor 146 there projects inwardly, on an axis parallel to the tilt axis 123, a sprocket drive 148. This drives reversingly a gear sector 149 secured to the tilt table 122 perpendicular to the axis 123.

Where relatively thick blades are to be used, it may be advantageous to utilize the two-piece construction shown in FIG. 7. In it an upper blade half, generally designated 151 and a lower blade half generally designated 152 are each first machined as separate precision-formed parts, each having a first principal surface 153, shown here as its outer surface, and a second principal surface 154, shown as its inner surface, the latter having leading edge, intermediate and trailing edge mting land surfaces 155, 156, 157. These are joined by a suitable adhesive layer 158.

Inspection of blanks so milled may be made visually by by using a series of templates having the desired blade profiles at successive stations from blade root to blade tip. This would furnish no measurements, or record thereof, as is desirable to demonstrate accuracy or discover specific defects. To make and record precise inspection measurements is therefore important.

Where a separate inspection center is provided, as is desirable for continuous production, it is preferred that the basic machine of such center have means to move the inspection probe 110 to take readings at closely spaced intervals by movements corresponding to all the necessary movements of the cutting tool 143, that is, vertically, longitudinally along the lead screw, and transverse, these movements to be coordinated with tilting movements of the tilt table 122 about the tilt axis 123 and of its swinging movements about the vertical axis 117. Since no substantial pressure is required even for a mechanical measuring probe, and none whatsoever for an optical type probe, the apparatus at the machining center need be only a fraction of the strength and weight of that described for the machining center. Yet, great savings of time and great assurance of production accuracy are achieved by obtaining and recording for each surface, after it is milled but before removing from the chuck, a series of inspection measurements by essentially the same movements as were utilized in machining the surface. Hence, where the needs of production do not dictate use of a separate inspection center, the same apparatus shown in FIG. 5 may be used to provide these inspection movements.

Thus, whether the center is separate or coincident with the machining center, it will include measuring means (such as the electronic probe 110 of FIG. 5, rotated to the phantom line position), movable at least vertically, longitudinally and in a transverse direction, as well as means, such as a conventional electronic recorder 111, to record measurements taken at a succession of spaced intervals along the principal surface so machined. In addition, there is to be provided a tilt table having track means extending longitudinally, which track means serve also to establish a plane of reference, whereby a chuck having means for positioning at such plane of reference may be affixed longitudinally along said track means, said tilt table having a tilt axis parallel to such plane of reference, means to tilt said tilt table, and means, adjacent to one end of said tilt table, to establish a swing axis, generally perpendicular to said tilt axis and means to move said tilt table arcuately about said swing axis, whereby movements of said measuring means and the tilt table tilting and swing movements may be coordinated and directed to provide a series of inspection positions according to an automated inspection program.

The process of the present invention requires only two stages of machining to complete an entire airfoil-section blade, although root and tip end lug portions may require further steps. A pair of chucks is to be prepared to fit metal blanks for each size part to be machined; that is, for turbine blades, a pair of chucks is produced for each size of blade (or for the thick blades shown in FIG. 7, comprised of two blade halves, for each blade half). Root and tip lug configurations may either simplify or complicate the problem of damming against outflow of matrix material at the chuck ends; ordinarily dams such as the dam 94 may be required, along with leading and trailing edge dams. The plan form of the first chuck, along its leading and trailing edges 53, 54, should substantially coincide with those of the blank 100 to be machined; the second chuck 50' may be smaller if the first machining has narrowed the blank's leading and trailing edges.

A program, integrated for chucking, machining and inspection, is begun by chucking a blade blank in a first chuck, for the machining and inspection of one surface to be machined, at or relative to a first plane of reference; then, for machining the opposite surface, transferring the blank to a second chuck, positioned at or relative to a second plane of reference precisely spaced from the first plane. The longitudinal and transverse registration of the chucks is precisely fixed, as is distance from a table tilt axis, where used to facilitate the final machining of leading and trailing edges without additional steps. However, the matrix material is readily cut by a milling cutter; and if a deep fill of matrix is employed between the blade blank 100 and the chuck upper surface 52, or if (unlike a turbine blade) the part does not require great precision in finishing its edges, it may be feasible to machine leading and trailing edges without tilting the table 122.

The preferred process proceeds as follows: A first principal surface 101 of the blank 100, selected as such in preparing the machining program, is given an adhesive coating 102, preferably using the epoxy material above mentioned, which cures at about 150° F. in approximately 15 minutes. The blank 100 is then positioned on the first chuck 50, spaced above the chuck fillable surface 52 by any suitable means, as by resting blank end lugs 99 on projections 58 at ends of the chuck 50. The spacing may be approximate if the thickness of the unmachined blank 100 permits, because the machining proceeds relative to the first plane of reference $P_1$, and is not dependent on minor blank irregularities or thickness variations.

The steps of positioning the blade blank 100 on the chuck 50, and affixing the dams 88, 90, 93 and 94, may, if preferred, be taken with the chuck 50 on the conveyer track 11 outside the chucking barrel assembly 10. However, the window openings 28 in the rotatable chucking barrel frame 22 permit easy access with the chuck 50 in position, as shown in FIG. 4, on the lower track portion 33 of the rotatable frame 22.

The terminal ends 78 of the electric heating element 76, and the end fittings 77 of the refrigerant coil 75, are connected to the electric connectors 161 and flexible refrigerant supply and return lines 162, at each end of the chucking barrel assembly 10 as shown in FIG. 1. These supply lines are long enough to permit the rotation of the rotary frame 22. For connection to the matrix supply disconnect fitting 81 is the matrix disconnect fitting 164 of an electrically heated supply line 165 for molten matrix material.

Molten matrix material from a source not shown is introduced through the supply line 165 into the chuck supply and drain channel 80. It rises through the grooves 66 around the serpentine refrigerant and heating elements 75, 76, and fills above the chuck upper surface 52 to the adhesive coating 102 on the downward-presented first principal surface 101. Contained by the dams mentioned, and maintained molten by the heater element 76, the matrix material supplies the heat for curing the epoxy adhesive coating 102. Since the melting point for the chosen matrix material is only slightly above the adhesive curing temperature, the heating element 76 may be maintained actuated through the greater part of the curing period. Then deactuated, refrigerant is pumped through the refrigerant coil 75 to chill the matrix material, hardening it with adherence to the adhesive coated principal surface 101. The dams 88, 90, 93 and 94 are then removed, the clamping screws 46 shown in FIG. 4 are loosened, the chuck 50 rises on its spring-loaded balls 85, and is then readily moved out from the lower track portion 33 along the track 11 and to the machining center 105.

Then, introduced over either the left end part 115 or right end part 120 onto the tilt table 122, the chuck 50 is precisely positioned at that distance from vertical axis 117 as is dictated by the machining program, and is clamped in place by the clamping screws 140. Clamping retracts the balls 85, bringing the machined lower surfaces of the clamping flanges 59 securely into contact with the machined planar outer portions 141 of the upper table portion 139. For purpose of the machining program, this duplicates the plane of reference $P_1$ with reference to which the blade blank 100 has been chucked; transverse registration, established in the chucking barrel by the vertical guide margins 37, is now duplicated by the corresponding vertical margins of the upper portion of the upper table portion 139.

The upper-presented second principal surface 104 of the blank 100 is now machined according to the machining program relative to duplicated first plane of reference $P_1$. The program causes and coordinates all necessary movements of the milling cutter 143. In order that the cutter 143 may move along what will be the airfoil streamlines when the turbine blade is used in an engine, mounted relative to its rotary axis, the machining program provides, instead of transverse movements of the cutter, the short reversing arcuate swinging movements of the table 114 about the vertical axis 117. One advantageous result is that the minute grooves, left in the blade surface by machining, will lie along the lines of air-flow, thus minimizing aerodynamic drag. Arcuate machining also makes easy the machining of an arcuate blade air-flow control fence 144 as seen in FIG. 5.

At least along the leading and trailing edges, machining problems are minimized by tilting to raise the blank leading edge as the cutter 143 approaches it, and similarly to raise the trailing edge as the cutter approaches it. The same milling cutter as used for the remainder of the airfoil surface will suffice to mill the critical leading edge to final dimensions. This illustrates the importance of the chucking system.

When the machining of the second principal surface is completed, it is inspected without removing the blank 100 from the chuck. While inspection could be made with templates, this would leave no accurate record from which manufacturing deviations could be identified or production standards established. Accordingly, one part of the present method is to make and record a programmed series of inspection readings of the newly milled surface without removing from the chuck.

As heretofore explained, such inspection readings may be made in the same machine as the machining center 105, if equipped with an electronic probe 110 or other suitable inspection device, such as a laser, of known construction. The inspection probe 110 is presented downwardly as shown in phantom lines in FIG. 5, and transmits, for recording by the recorder 111, readings of dimensions at closely spaced points. For this purpose the inspection program provides positioning of the probe 110 at chosen measuring points, successively, by movements which may duplicate, to some extent, those of the milling cutter 143, along with tilt and swinging movements of the machine table 114.

For high production it will be preferred to make such readings at a separate inspection center, with the inspection probe 110 carried by apparatus having the same movement capabilities as the machining center 105, that is: longitudinally along a lead screw, vertically, transversely, arcuately about a vertical axis 117, and tilting about a horizontal axis 123. Furthermore, the chuck 50, 50' must be carefully clamped along a tilt table, corresponding to that of the machining center, whose plane of reference, relative to its tilt axis, precisely corresponds to the plane of reference relative to which it has been chucked and machined, in precise longitudinal and transverse registration. The alternative of performing the inspection in the machining center 105 as shown in FIG. 5, without removing the chuck from its position when machined, would of course avoid any problems relative to relocation in the inspection center.

On completion of inspection, an adhesive coating 102 is applied to the newly machined second principal surface 104. The chuck 50 with the blade in place is returned to the rotating barrel frame 22, and clamped in position shown in FIG. 4. The barrel frame 22 is rotated precisely 180° about its pivot axis 20 to invert the chuck 50 so that its plane of reference $P_1$ is now above, as shown in FIG. 6. With the alternate track portion 38 now in downward retracted position, a second chuck 50' is clamped in place on it. If machining of the leading and trailing edges has substantially reduced the chordwise extent of the blank 100, the chuck 50' may be correspondingly narrower than the chuck 50, as seen in FIG. 6.

The second chuck 50' is now raised, as shown in FIG. 6, by the ball screw drives 42 to bring the plane of reference $P_2$ a precise distance D from the plane of reference $P_1$ of the lower track portion 33. This brings the already machined (second) principal surface 104 a precise distance from the second chuck 50'; a fill of matrix material on this chuck's fillable surface 52' up to the machined surface 104 will hold the blank 100 for machining of the opposite surface 101 to precisely the design thickness.

Referring again to FIG. 6, the leading and trailing edge dams 88', 90' there shown, as well as root and tip dams when necessary, are now affixed. Electric and refrigerant lines 161, 162 are now connected to both the original chuck 50 and the newly positioned chuck 50'; and the supply line 165 for molten matrix material is connected to the chuck 50'.

Molten matrix material is then introduced into the chuck 50', filling to the downward-presented adhesive coating 102 on the newly-machined blank surface 104, seen in FIG. 6. To avoid the heat of this molten matrix material, the upper chuck 50 is maintained chilled. The newly-supplied matrix material cures the adhesive coating 102 on the downward-presented surface 104; when curing is complete is complete, refrigerant is supplied to the chuck 50' to harden its matrix quickly. The blank 100 is now tightly secured to both chucks.

On disconnecting the matrix material supply line 165, the rotatable barrel frame 27 is again rotated precisely 180° to bring the first chuck 50 to its lowermost position, as shown in FIG. 4, with the second chuck 50' now inverted. Continuing the supply of refrigerant to the now upward chuck 50', heat is supplied to the chuck 50, to melt out the matrix from it and release it. Much of the melted material may drain through the matrix supply and drain channel 80. However, that part of the matrix material which overflows from the chuck surface 52 may be conducted away by the drain grooves 67. In any event, the 158° melting point of the matrix material simplifies clean-up of spilled matrix material, for example, by hot water. At this stage the alternate track portion 38 may be fully raised, and the released chuck 50 removed to the track 11 and out of the way; or it may remain in the track portion 38 for chucking another blank 100.

The barrel frame 22 is again rotated to the FIG. 6 position. With the chuck 50' lowered to the level of the track 11, the dams 88', 90', 93' and 94' are removed. The chuck 50' is then conveyed to and affixed in position on the tilt table 122 of the machining center 105. The adhesive coating 102 on the first principal surface 101 may now be removed.

Machining of the upward-presented first principal surface 101 now proceeds according to the machining program in the same manner as heretofore described for the opposite surface first machined. Thereafter follow the functions of the inspection center as hereinabove described. The chuck 50' is then returned via the track 11 to the chucking barrel 20 where the heating element 76 is again connected and energized to melt out the matrix material from the chuck 50.

Because of the precise superposition, as described, of the second plane of reference $P_2$ relative to the first plane of reference $P_1$, precise control has been achieved of the blade thickness, without any measurable deflection or other distortion due to machining. This removes the necessity, in the prior art, of hand-finishing operations.

The described swing movements about the vertical axis 117 are of particular importance where an arcuate blade fence 144 is to be used, as will be apparent to those experienced in the difficulties of providing such a fence by chordwise machine cuts. However, such arcuate swinging, and the attendant complexities of the apparatus mechanical features and controls which it requires, may be dispensed with in many instances. Likewise, the tilting about the longitudinal axis 123, although advantageous for precise finishing of leading and trailing edges, may in many cases be dispensed with, for example, by using deeper fill of matrix material, so as to provide clearance for machining cutters. Such deeper fill will, of course, require longer times for hardening and melting.

For making relatively thick blades, weight may be saved by the construction of FIG. 7. All the process steps hereinabove defined are taken with regard to each of the blade halves 151, 152, except that the program for machining the principal surfaces 154, which will become the interior surfaces, provides for cutting with lands 155, 156, 157, rather than an airfoil contour. While these lands are shown as lying in a plane, other mating arrangements may be designed.

These interior surfaces 154 are the surfaces first chucked in chucks 50 so the exterior surfaces 153 are thus the surfaces first machined (the "second principal surfaces"). Each part is then transferred to a second chuck 50 for adherence to the outer, machined surface 153 and for machining its interior surface 154. The new fully machined parts, are not released from the second chucks 50' but are retained in place in them.

To join them together with control over final airfoil thickness, the two second chucks 50' are clamped opposite each other, on the lower track portion 33 and the alternate track portion 38 of the rotatable barrel frame 22. With their land surfaces 155, 156, 157 coated with an excess amount of an adhesive 158 conventional for bonding metal airfoils, actuation of the ball screw drives 42 brings the planes of reference $P_1$, $P_2$ to a new design distance calculated to squeeze out unnecessary adhesive and establish a precise final thickness for the adhered airfoil as shown in FIG. 7.

Thereafter, with heat supplied to the lower of the two chucks, and refrigerant to the upper chuck, the matrix material is melted away from the lower chuck, releasing the undersurface of the adhered blade. The barrel frame 22 is then rotated 180°, and the now lower chuck is supplied with heat to melt away the matrix material. When this has been accomplished, the completed two-piece blade of FIG. 7, is removed.

From the foregoing it will be obvious that the present apparatus and process are especially advantageous for chucking, machining and inspecting articles characterized by having generally opposite principal surfaces whose width between forward and rear edges is greater than its thickness between such principal surfaces. Further, the present invention has general applicability to chucking articles whose deflection during machining or manufacturing like processes would otherwise defeat the accuracy of such processes; and for transferring articles having two opposite principal surfaces from one chuck to another after treatment of the first-exposed surface.

While the best mode of both process and apparatus, as now contemplated by the inventor, have been described, useful modifications thereof will be apparent from the teachings hereof to persons skilled in the art. For example, while I have here illustrated and described chucking a blade blank by adhesion of matrix material to its entire downward-presented surface, chucking rigidity, adequate to avoid deformation on machining relatively thick blanks, may be obtained by using narrower chucks from which both leading and trailing edges of the blank project outward beyond resilient top edges of dams. This may avoid the necessity for machining with tilt. Hence in the claims, "forward and rear edge damming means" is to be construed to include dams beyond which such edges project. As another example, the two-piece airfoil, shown in FIG. 7 as hollow, may be filled with light-weight structural filler material such as honeycomb; and in the claims the term "hollow" is to be construed as including airfoils so filled. Also, simpler expedients may sometimes be adequate for releasing from the chucks, and particularly for releasing from the first chuck after adhering to the second. One such expedient is using, in the first chuck, matrix material whose melting point is higher than that used in the second chuck, so that the first chuck need not be refrigerated as the second is filled. To do so requires a second source of molten matrix and forfeits some of the significant advantages of the lower melting point material. Another expedient for release is to use adhesive coatings which may adhere matrix material sufficiently to withstand machining forces, but will not withstand gentle pry-off forces. Hence in the claims, the term "release" or "releasing" is to include all such obvious expedients.

In the preferred embodiment of chucks herein shown and described, the groove pattern is generally serpentine, which lends itself well to shaping the heater and refrigerant elements for chucking twisted turbine blade blanks. Other patterns of grooves may be useful in specific applications. Heating means other than electrical may be used in the grooves, such as tubing elements which conduct oil or other heated liquid.

As an alternative to using the undersurfaces of the chuck clamping flanges 59 to establish the plane of reference for machining by clamping against outer track portions 35, each chuck might instead by provided with a central machined undersurface to bear against the upper surface of the central elevated track portion 36.

The feature of machining with tilt, which makes possible the complete machining of leading and trailing edges with only the two stages of chucking described, is of particular importance when the part to be machined is highly twisted, like the turbine blade illustrated. The tilt feature permits the progressive machining of the blade blank with its chord plane, at each spanwise point of machining, positioned substantially horizontal. This feature may also prove of great advantage in machining other difficult parts.

While forged blanks are utilized for turbine blades, the present process has obvious utility for machining castings, obviating the necessity for "qualifying", i.e., spot-facing locator spots to establish a reference for conventional chucking and machining; hence, the term "blanks" is to be taken to include castings. Such blank may have more than two significant surfaces; the term "principal surface" means one of those two surfaces of a blank, generally opposite to each other, by which the blank may be matrix-chucked.

The embodiments of the invention in which an exclusive property or privilege is claimed are defined as follows:

1. For chucking metal blanks of the type having two generally opposite principal surfaces and whose width, between forward and rear edges of such surface, is greater than its thickness between such principal surfaces,
   a chucking center including
   a barrel frame and means to support said barrel frame along a horizontal pivot axis,
   a first track portion on said frame extending parallel to the pivot axis, and including means to support a meltable matrix chuck and establish for it a first generally horizontal plane of reference at a radial distance from said horizontal pivot axis, as well as means to establish the transverse location of a chuck thereon,
   the barrel frame having means to position said track portion at a base level,
   an alternate track portion supported on said barrel frame 180° removed from said first track portion, said alternate track portion including means to support a meltable matrix chuck inverted relative to said first mentioned chuck support means, and including means to establish, for a chuck thereon, a second plane of reference parallel to the first and the transverse location of a chuck thereon,
   means to turn said barrel frame 180° about said horizontal pivot axis, and
   means to adjust the spacing of said alternate track portion from said first track portion, whereby chucks supported within said barrel frame, inverted relative to the other, may be brought from juxtaposed position, at which their planes of reference are at a chosen spacing, to a clearance position at which either said first track portion or said alternate track entrant portion may be at such base level.

2. A chucking center as defined in claim 1, in combination with
   means to deliver refrigerant to and to provide heat energy to meltable matrix chucks when so supported within said frame, said means being characterized by sufficient flexibility to permit such 180° turning of said frame,
   means to provide molten matrix material to one of said chucks when supported by one of said track portions within said frame.

3. For chucking a metal blank of the type having two generally opposite principal surfaces and whose width, between forward and rear edges, is greater than its thickness between said principal surfaces,
   a meltable matrix chuck whose plan form is at least in part coincident with that of such blank, the chuck being of the type having a normally upward surface fillable with meltable matrix chuck material and having downward-facing means for positioning at a plane of reference,
   the said fillable surface of said chuck being provided with connected grooves,
   port means for permitting the inflow, into said connected grooves, of molten matrix material, and
   heater and refrigerant-conducting means accommodated and releasably secured within said connected grooves, and leading to and having disconnect fittings outward of said chucks,
   said grooves being of substantially greater cross-section than that occupied by said heater and refrigerant-conducting means,
   whereby the heating and cooling effected by the heater and refrigerant-conducting means may pass by conduction directly to and through such matrix material, in combination with
   removable means, fittable along edges of said chuck and extending above the chuck fillable surface, to dam against edges of such blank, whereby to contain molten matrix material beneath a principal surface of the blank.

4. A meltable matrix chuck as defined in claim 3, wherein
   said fillable surface is so twisted as to follow the conformation of a turbine blade blank characterized by twist from root to tip,
   said grooves being in a serpentine pattern including substantially parallel portions extending chordwise and having a groove entrance adjacent to one end of the chuck.

* * * * *

UNITED STATES PATENT AND TRADEMARK OFFICE
CERTIFICATE OF CORRECTION

PATENT NO. : 4,730,382

DATED : March 15, 1988

INVENTOR(S) : John T. Parsons

It is certified that error appears in the above-identified patent and that said Letters Patent is hereby corrected as shown below:

Column 2, line 36, delete "agains" and substitute ---against---.

Column 9, line 11, delete "mting" and substitute ---mating---.

Column 11, line 47, delete "swining" and substitute ---swinging---.

Column 13, line 3, delete "is complete" first time it occurs.

Column 15, line 20, delete "by" and substitute ---be---.

Signed and Sealed this

Twenty-third Day of August, 1988

Attest:

DONALD J. QUIGG

*Attesting Officer*   *Commissioner of Patents and Trademarks*